US008649632B2

(12) United States Patent
Neophytou et al.

(10) Patent No.: US 8,649,632 B2
(45) Date of Patent: Feb. 11, 2014

(54) SYSTEM AND METHOD FOR CORRELATING OBLIQUE IMAGES TO 3D BUILDING MODELS

(71) Applicant: Hover, Inc., Los Altos, CA (US)

(72) Inventors: Neophytos Neophytou, Glen Cove, NY (US); Marc L. Herbert, Wantagh, NY (US); James L. Pittel, Glen Head, NY (US)

(73) Assignee: Hover, Inc., Los Altos, CA (US)

( * ) Notice: Subject to any disclaimer, the term of this patent is extended or adjusted under 35 U.S.C. 154(b) by 0 days.

(21) Appl. No.: 13/858,707

(22) Filed: Apr. 8, 2013

(65) Prior Publication Data

US 2013/0222375 A1 Aug. 29, 2013

Related U.S. Application Data

(62) Division of application No. 12/265,656, filed on Nov. 5, 2008, now Pat. No. 8,422,825.

(51) Int. Cl.
*G06K 9/36* (2006.01)
*G06F 17/50* (2006.01)

(52) U.S. Cl.
USPC .............................................. 382/285; 703/1

(58) Field of Classification Search
USPC .......................................................... 382/285
See application file for complete search history.

(56) References Cited

U.S. PATENT DOCUMENTS

| | | | | |
|---|---|---|---|---|
| 6,597,818 | B2* | 7/2003 | Kumar et al. | 382/294 |
| 6,975,326 | B2* | 12/2005 | Baumberg et al. | 345/582 |
| 7,199,793 | B2* | 4/2007 | Oh et al. | 345/419 |
| 7,508,977 | B2* | 3/2009 | Lyons et al. | 382/154 |
| 8,078,436 | B2* | 12/2011 | Pershing et al. | 703/2 |
| 2008/0089577 | A1* | 4/2008 | Wang | 382/154 |
| 2008/0140271 | A1* | 6/2008 | Garceau et al. | 701/10 |
| 2008/0221843 | A1* | 9/2008 | Shenkar et al. | 703/1 |

* cited by examiner

*Primary Examiner* — David Zarka
(74) *Attorney, Agent, or Firm* — Garlick & Markison; Randy W. Lacasse

(57) ABSTRACT

Embodiments of the invention relate to the visualization of geographical information and the combination of image information to generate geographical information. Specifically, embodiments of the invention relate to a process and system for correlating oblique images data and terrain data without extrinsic information about the oblique imagery. Embodiments include a visualization tool to allow simultaneous and coordinated viewing of the correlated imagery. The visualization tool may also provide distance and measuring, three-dimensional lens, structure identification, path finding, visibility and similar tools to allow a user to determine distance between imaged objects.

20 Claims, 14 Drawing Sheets

US 8,649,632 B2
// 1

SYSTEM AND METHOD FOR CORRELATING OBLIQUE IMAGES TO 3D BUILDING MODELS

CROSS REFERENCE TO PATENT APPLICATIONS

The present U.S. Utility patent application claims priority pursuant to 35 U.S.C. §121, as a Divisional, to U.S. Utility patent application Ser. No. 12/265,656, filed Nov. 5, 2008, entitled, "Method and System for Geometry Extraction, 3D Visualization and Analysis Using Arbitrary Oblique Imagery," to be issued on Apr. 16, 2013 as U.S. Pat. No. 8,422,825, which is hereby incorporated herein by reference in its entirety and made part of the present U.S. Utility patent application for all purposes.

BACKGROUND

1. Field of the Invention

Embodiments of the invention relate to the visualization and correlation of geographical information and image information. Specifically, embodiments of the invention relate to a process and system for correlating a set of oblique images to real world coordinates and providing interactive tools to utilize the correlated images.

2. Background

Images of a geographic region are used for construction and military purposes. Construction planners utilize detailed maps and images of a potential construction site during development planning Military intelligence use image data to identify or monitor potential military targets or strategic locations. Satellite images of an area are available for these purposes, but due to their "bird's eye" or orthogonal view point, it is difficult to use these images for determining the height of imaged structures or characteristics of imaged structures. These aspects of structures are visible from an angled or "oblique" view point. Oblique images can be captured through aerial photography. To correlate information between different oblique images, terrain maps and orthogonal images, it is necessary to have precise information about each of the oblique images and the sources of the oblique images. For each image, the camera location, speed of travel, lens focal length, camera angle, altitude, range finding information and similar information are needed to correlate the images to a terrain map. Images captured from moving vehicles must be travelling in a straight path and similar restrictions on information requirements are necessary to correlate information to a terrain map. Systems for correlating images to terrain maps are not able to utilize images if this extrinsic information is unavailable.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
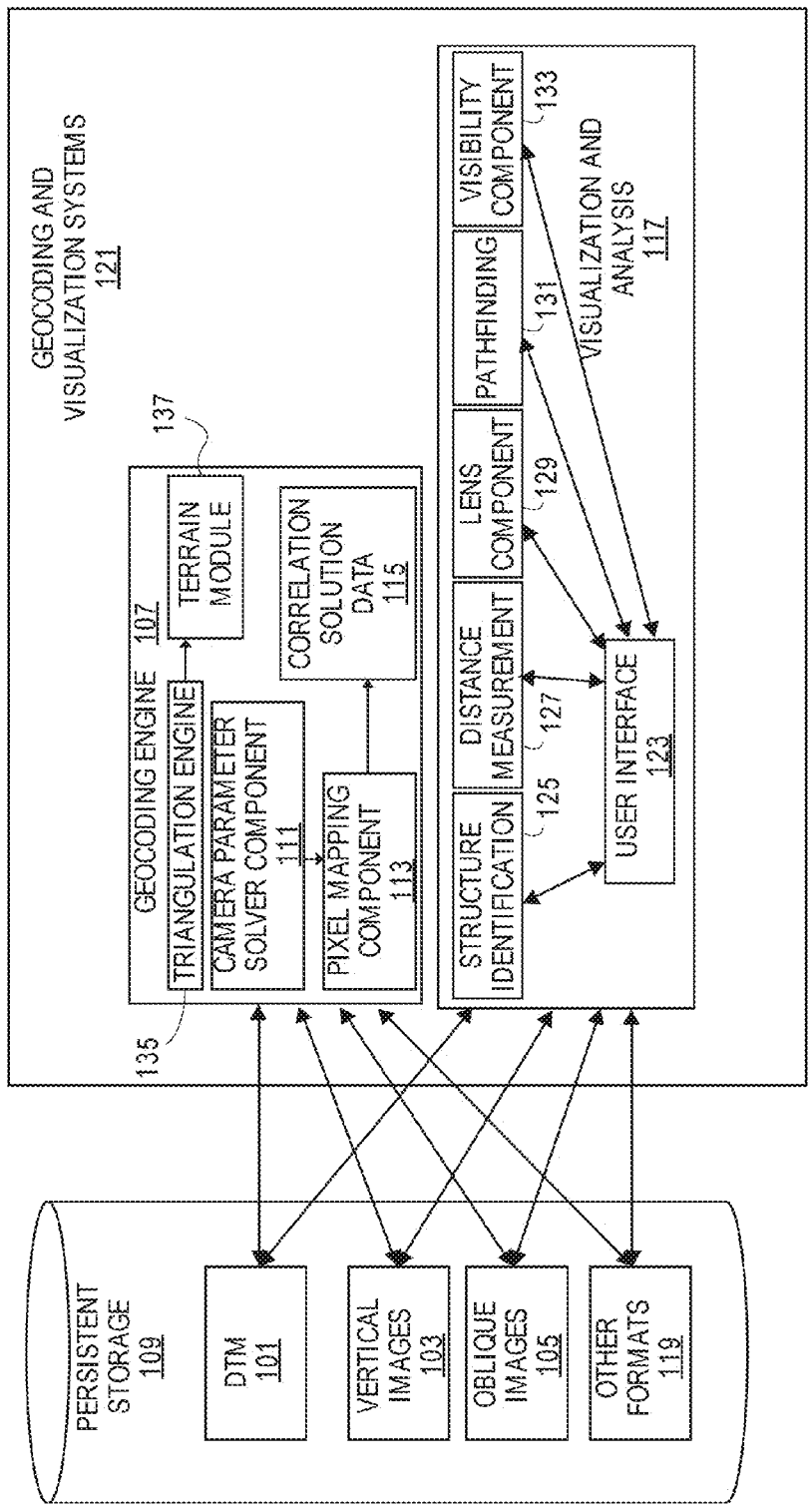
FIG. 1 is a diagram of one embodiment of a geocoding engine.

FIG. 1 is a diagram of one embodiment of a geocoding engine. "Geocoding" as used herein is a correlation of image data to world coordinate data. The world coordinates may be real world coordinate data, virtual world coordinate data or similar coordinate system data. In one embodiment, the geocoding and visualization system 121 has access to multiple types of geographical data and imaging data. This data is stored in an electronic storage medium such as a persistent storage system 109 in communication with the system 121. Geocoding and visualization system 121 can operate on a single machine such as a desktop computer, workstation, mainframe, server, laptop computer or similar computer system or can be distributed across multiple computer systems. Persistent storage systems 109 can be any type of magnetic, optical, FLASH or similar data storage system.

In one embodiment, the geocoding and visualization system 121 has access to a set of digital terrain models (DTM) 101. A 'set' as used herein is any number of items including one item. A DTM 101 includes a set of universal terrain map coordinates identifying the absolute location and elevation of a set of points in a geographical region of the earth. The coordinate system can be any coordinate system including latitude and longitude or similar systems. In another embodiment, the system 121 utilizes digital elevation models (DEMs) or similar models and terrain mapping systems in place of or in combination with DTMs. For sake of convenience, DTMs are discussed herein as one example embodiment. DTMs 101 are available for many areas of the world. However, DTMs 101 do not include information about man made structures such as buildings, roads, bridges and similar structures.

Another type of information that is available to the system 121 is vertical images 103 such as orthogonal images and similar images. A vertical image 103 is a vertical or orthogonal view of the terrain and structures in a defined area. As used herein a 'vertical image' is an image captured from an overhead position, a position above a target, or at a right angle or an angle near to a right angle to the target. For example, the image can be taken from an overhead position at an eighty-seven degree angle or similar angle close to a ninety-degree angle. A vertical image can be 'rectified' to fit an associated DTM. Rectifying a vertical image entails mapping the pixels of the vertical image to the coordinates of a DTM. For sake of convenience, as used herein a 'vertical image' can be either a rectified image or standard image. A vertical image 103 can be used for measurements of distances and object relationships by providing exact geographical locations for objects such as buildings and similar structures. However, many details and characteristics of structures and objects are hidden in vertical images. For example, in a vertical image, it is difficult to distinguish between different types of objects such as pipes, fences, paths, and ditches, because from the vertical viewpoint they have a similar appearance. A third type of information that is available to the system 121 is oblique imaging 105. Oblique imagery 105 includes images taken at an angle other than the vertical perspective or images derived from vertical imagery that provide perspective after processing. Oblique images provide a perspective line of sight that reveals information that is not visible in an orthophoto view. For example, an oblique image has an angle to the target between zero and eighty-nine degrees.

Figure 2B:
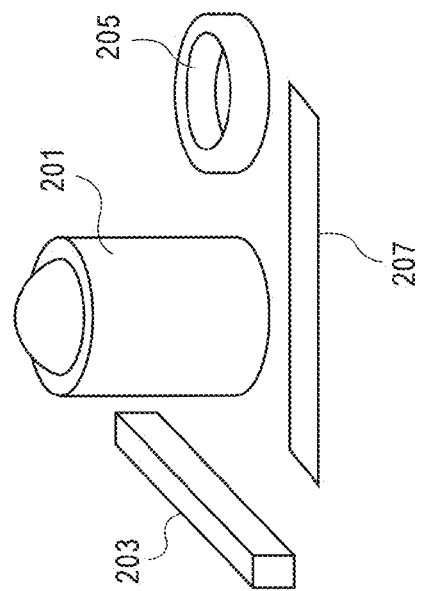
FIG. 2B is an illustration of one embodiment of an oblique photo.
Figure 2A:
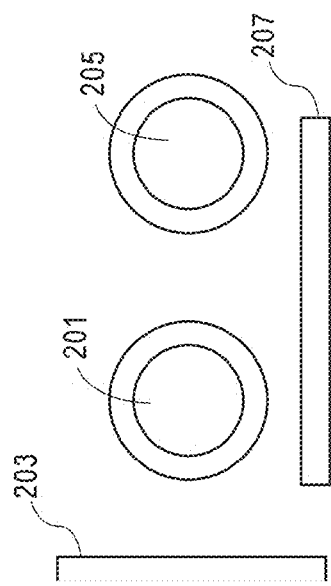
FIG. 2A is an illustration of one embodiment of an orthophoto.

FIG. 2A is a diagram of one embodiment of an example vertical image depicting a first structure 201, a second structure 203, a third structure 205 and a fourth structure 207. Vertical images can be captured by aerial photography, satellite imagery, laser radar (lidar), synthetic aperture radar (SAR), standard radar, infrared systems or similar systems. Structures 201 and 205 in the vertical image view depicted in FIG. 2A appear as two concentric circles. Structures 203 and 207 appear to be elongated structures that run along side the other structures. However, it is not clear from the vertical image view what each of the structures in fact is. For example, structures 203 and 207 may be ditches, walls, pipes, power lines, shadows or similar structures or terrain features. Structures 201 and 205 may be pits, wells, fences, multilevel structures or similar structures. Without perspective, it is not possible to identify these structures or features.

FIG. 2B is a diagram of one embodiment of an example oblique perspective of the structures depicted in FIG. 2A. Oblique images can be captured by aerial photography or imaging systems, satellite imagery, aerial sensor systems, ground based imaging systems, video or video capture technology and similar systems. It can be seen from the illustration of FIG. 2B that structure 201 is a silo type structure with a domed roof. Structure 205 is a well structure with only a small portion of the circular wall of the well above ground. Structure 203 is a wall like structure. Structure 207 is a flat structure like a path or road. Structures 201, 203, 205 and 207 appear very different viewed at the angle of an oblique image. In contrast, in the vertical image view of FIG. 2A it is difficult to identify each of the structures. However, it is difficult to correlate an oblique viewpoint image with information such as a DTM to determine real world coordinates for aspects of structures depicted in the image.

Returning to the discussion of FIG. 1, in one embodiment, the geocoding engine 107 receives each of these types of information (DTM, vertical images and oblique images) and correlates each type of data. The geocoding engine 107 includes a triangulation engine 135, camera parameter solver 111, pixel mapping component 113 and generates a terrain model 137 and correlation solution data 115. The geocode engine 107 may be a single application or software module or a set of applications or software modules. The geocode engine 107 can operate on a single machine or can be distributed over a set of machines.

In one embodiment, to geocode the incoming information and find the correlation between the oblique imagery, the DTM and vertical imagery, it is necessary to determine the ground elevation (z coordinate) information as well as each x and y coordinate associated with these images. The triangulation engine 135 utilizes the DTM to generate the ground z value for each x and y coordinate pair relevant to the set of images or area to be analyzed. The triangulation engine 135 can be a separate application or a module or component of the geocode engine 107. The triangulation engine 135 uses the Delaunay Triangulation process and an error-based simplification process to obtain a triangulated model of the terrain 137, which is made accessible to the visualization and analysis component 117.

Other techniques for determining the set of z values that may be used in the analyzed area include natural neighbor interpolation, surface patches, quadratic surfaces, polynomial interpolation, spline interpolation, Art Gallery Theorem, Chvátal's Art Gallery Theorem, compact surface, Japanese Theorem, simple polygon, tessellation, triangulation point, convex hull, halfspace intersection, Voronai diagrams or similar methods and algorithms. In one embodiment, a Delaunay triangulation method is used such as the 'radial sweep,' Watson algorithm, 'gift wrap,' 'divide and conquer,' 'incremental' or similar Delaunay triangulation variation. In one embodiment, a simple case may be a regular grid of elevations that is directly interpolated.

In one embodiment, the triangulation engine 135 outputs a resulting set of x, y and z coordinates or a vertex array as an enhanced terrain model 137. This enhanced terrain model 137 can be passed on or made available to the visualization and analysis tool 117. The triangulation engine 135 also passes the enhanced terrain model 137 on to the camera parameter solver component 111 and pixel mapping component 113.

In one embodiment, the camera parameter solver 111 utilizes the terrain model 137, vertical imagery data 103 and oblique imagery data 105. The camera parameter solver component 111 can be a separate application or a module or a component of the geocode engine 107. In one embodiment, a vertical image 103 may be rectified to the enhanced terrain map 113 using standard rectifying methods. Rectifying the vertical image can include manipulating the resolution or orientation of an orthophoto to correspond to the proportions and characteristics of the DTM or enhanced terrain map.

In one embodiment, the camera parameter solver component 111 and pixel mapping component 113 are tasked with correlating the oblique imagery 105 with the rectified vertical image and enhanced terrain model. The camera parameter solver 111 utilizes four or more "tie points" in the process of determining the position and orientation of each image and the camera that took the image. This information is then utilized to map each pixel of these pixels to real-world coordinates thereby correlating each of the images with one another by tying them to real-world coordinates. A tie point is a point identified by a user or through automatic means that is located on the ground in each of the rectified vertical images and oblique images.

For the sake of convenience, this discussion utilizes an example where a single vertical or oblique image is correlated to real-world coordinates. This process can be extrapolated to combine any number of rectified vertical images and oblique images. Utilizing the tie points, the camera parameter solver component 111 and pixel mapping component 113 determine an x, y and z coordinate for each pixel location in each oblique image. This correlation of pixel locations and coordinates is stored or output as solution data 115 to be utilized by the visualization and analysis tool 117. The solution data 115 and enhanced terrain model 137 are stored for future use in any electronic medium (e.g., persistent storage system 109) that is in communication with the system 121.

In one embodiment, to complete the correlation of the oblique image and the rectified image, the camera parameter solver component 111 determines the exact location of the camera that captured each oblique image including the coordinates, focal length, orientation and similar information related to the camera that captured the oblique image. If this information is known then the known information may be utilized. However, the camera parameter solver component 111 is capable of determining or approximating this information for each oblique image without any extrinsic information about the oblique image.

The pixel mapping component 113 utilizes the camera parameters generated by the camera parameter solver component 111 as well as the enhanced terrain model 137 and maps each pixel of the oblique images to real-world x, y and z coordinates. The pixel mapping component 113 outputs resulting correlation solution data 115 that can then be processed and utilized by the visualization and analysis tool 117.

Figure 11:
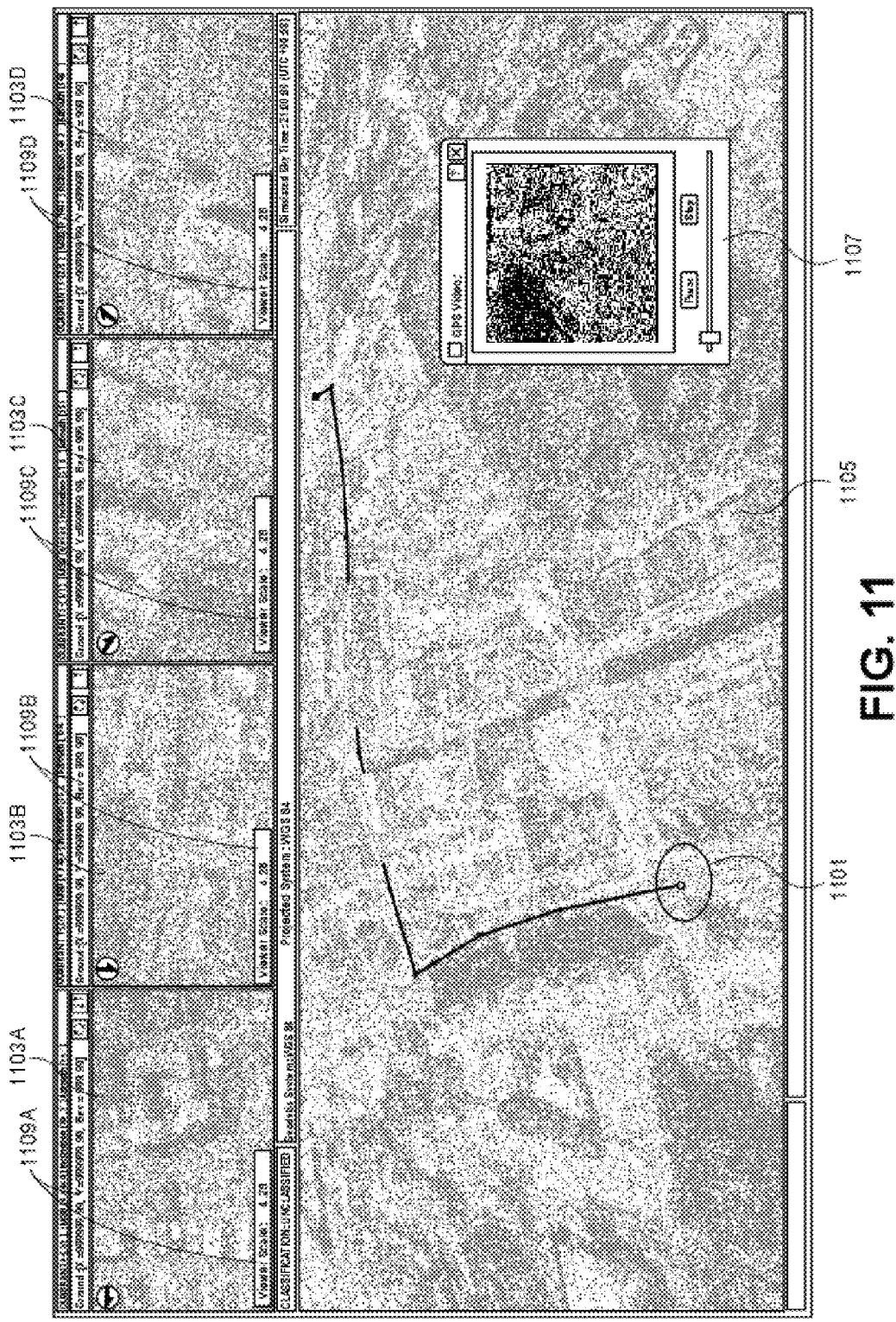
FIG. 11 is a diagram of one embodiment of an integrated visualization and analysis interface.

In one embodiment, the visualization and analysis tool 117 allows a user to interact and view the correlated imagery and information. FIG. 11, discussed in further detail below, is a diagram of one embodiment of the interface for the visualization and analysis tool 117. The interface allows a user to view each of the images alone or in combination with one another and view the orientation of each image in relation to the other images. In addition, the visualization and analysis tool 117 provides a set of additional tools for marking points in the images, such as tie points. Other tools provided by the visualization and analysis tool 117 include distance measurement tools for checking a distance within images, path finding tools 131, structure identification tools 125, three-dimensional lens component 129, visibility component 133 and similar tools. The visualization and analysis tool 117 utilizes the solution data 115 and enhanced terrain model 137 to generate the view of and manipulation of images as well as support other tools.

In one embodiment, the geocoding engine 107 and visualization and analysis tool 117 also utilize other data formats and types as input. In one embodiment, the other types of data include video data and video capture data, three dimensional model data, other types of mapping data, extrinsic imagery data such as range finding and altimeter data, imaging device related data such as camera type and focal length of a lens, vehicle data related to the capture of the image such as vehicle speed and similar data.

The data generated by the geocoding engine 107 can be exported to other programs. For example, other applications that utilize the data generated by the geocode engine may include computer aided design (CAD) programs, geographic information systems (GIS) and 3-D model rendering programs. In one embodiment, the solution data 115 and visual representation of the data is formatted or converted for use or display through a website or similarly presented on the Internet. This data is made available and transmitted to electronic devices including laptops, field equipment global positioning (GPS) devices, personal digital assistants (PDAs), command and control systems and similar devices.

The structure identification component 125 can be a component of the visualization and analysis tool 117 or a separate component that interfaces with the visualization and analysis tool 117. The structure identification component 125 receives user input that identifies a façade or rooftop of a structure through a user interface 123 of the visualization and analysis tool 117. The structure identification component 125 then identifies the other features such as the walls of the structure using the solution data 115. The textures of each wall and roof of the structure are retrieved from corresponding images. A model and texture overlay is then created from this data. The model and texture overlay can be rotated in three dimensions through the visualization and analysis tool 117.

The distance measurement component 127 can be a component of the visualization and analysis tool 117 or a separate component that interfaces with the visualization and analysis tool 117. The distance measurement component 127 receives input from a user through a user interface 123 of the visualization and analysis tool 117. The user input identifies a start and end point for a distance measurement. The distance measurement can be an elevation measurement, a ground measurement or any combination thereof. The distance measurement component 127 utilizes the solution data to calculate the distance between the two identified points.

The three-dimensional lens component 129 can be a component of the visualization and analysis tool 117 or a separate component that interfaces with the visualization and analysis tool 117. A user can activate the three-dimensional lens component 127 through the user interface 123 of the virtualization and analysis tool 117. The three-dimensional lens component determines the current viewing angle of a user through the user interface 123 of the visualization and analysis tool 117. An oblique or similar image with the closest corresponding viewing angle is selected using the solution data 115. The pixels of the selected oblique image that correspond to a lens area in the user interface 123 are projected or drawn into the lens area to give a three-dimensional perspective to an area of a two-dimensional vertical image. The lens can be moved by a user over any two dimensional vertical image and the displayed three-dimensional perspective is updated as the lens moves and as the point of view in the user interface changes. This update can include selecting a different oblique image to map into the lens based on proximity to the change in the point of view.

The path finding component 131 can be a component of the visualization and analysis tool 117 or a separate component that interfaces with the visualization and analysis tool 117. The path finding component 131 receives input from a user through a user interface 123 of the visualization and analysis tool 117. The user input identifies a start and end point for a path. The user can also identify any number of intermediate points for the path. The path finding component 131 draws the path in each displayed correlated image of the user interface 123 by plotting the path in each image using the solution data 115.

The visibility component 133 can be a component of the visualization and analysis tool 117 or a separate component that interfaces with the visualization and analysis tool 117. The visibility component 133 can receive a user input through the user interface 123 and/or data from the path finding component 131. The visibility component 133 can identify lines of sight to an identified point or path using the solution data 115. The visibility is then displayed through the user interface 123.

Figure 3:
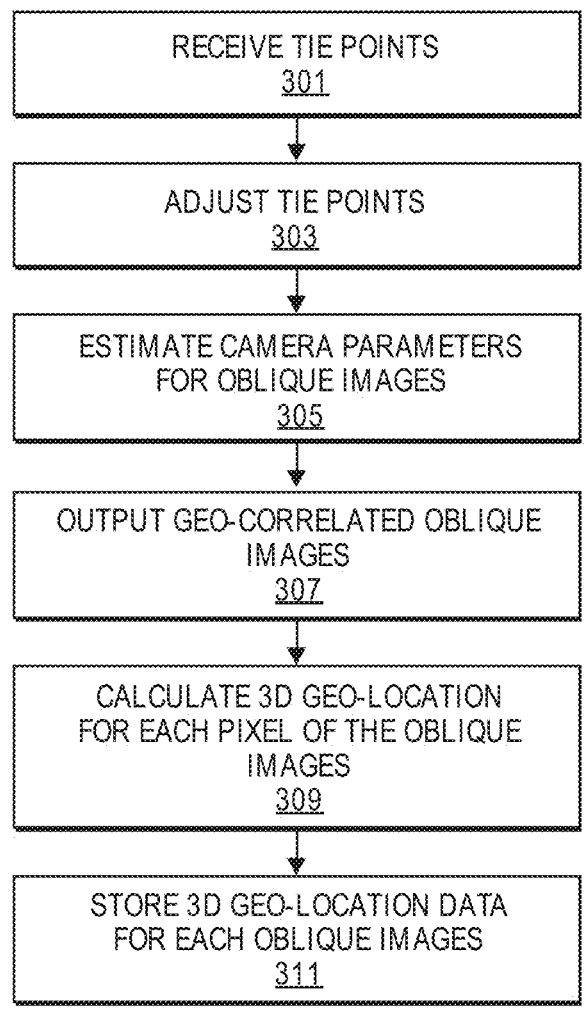
FIG. 3 is a flowchart of one embodiment of a process for geo-locating images.

FIG. 3 is a flowchart of one embodiment of a process for geo-locating images. The process can be initiated by input of tie points (block 301). Tie points are a set of pixels or locations within a set of images that match one another. The tie points are locations of aspects of structures or features in each image. For example, a tie point can be a corner of a building. In one embodiment, tie points must be natural or man-made features on the ground such as building floor corners, roads or similar structures or features. The same corner is identified in each image. Any number of images and tie points can be input. In one embodiment, a minimum of four tie-points must be identified in each image and include a vertical image or other image that is correlated to a terrain model.

In one embodiment, the visualization and analysis tool adjusts the selected tie points (block 303). The adjustment relies on edge detection and similar algorithms to find specific features such as building corners in proximity to the selected location within an image. The tie points are then moved to correspond to the detected feature or structure. This allows a user to select tie points without having to closely zoom into each image, thereby improving the speed at which tie points can be selected.

After a set of tie points is input for each image an estimate of the camera parameters for each image is calculated (block 305). The process of determining the camera parameters is discussed below in further detail in regard to FIG. 4. The camera parameters can be calculated without any extrinsic data related to the images. The camera parameters can include the focal length, film size, camera orientation and similar image data. The camera parameters allow for the geocoding or correlation of the oblique images (block 307).

The geocoding or correlation data is then utilized to correlate each pixel of the images to real-world coordinates. This can be achieved by recovering the two-dimensional pixel location on a geo-correlated oblique image, given a three-dimensional geo-location chosen in the overlapping area of the vertical image. In one embodiment, the following formula is utilized for this mapping where (X,Y,Z) is the original point in world coordinates, $(X_0, Y_0, Z_0)$ is the camera location in world coordinates, r is the 3×3 rotation matrix representing the camera orientation, FocalLength is the camera's focal length, ScaleFactor is the film scaling factor (in terms of pixels per mm), imgSize.width is the width of the image in pixels, imgSize.height is the height of the image in pixels and result is the resulting point in image coordinates (pixels):

$$P \cdot x = FocalLength \frac{r_{11}(X-X_0) + r_{12}(Y-Y_0) + r_{13}(Z-Z_0)}{r_{31}(X-X_0) + r_{32}(Y-Y_0) + r_{33}(Z-Z_0)} ScaleFactor + \frac{imgSize \cdot width}{2}$$

$$P \cdot y = FocalLength \frac{r_{21}(X-X_0) + r_{22}(Y-Y_0) + r_{23}(Z-Z_0)}{r_{31}(X-X_0) + r_{32}(Y-Y_0) + r_{33}(Z-Z_0)} ScaleFactor + \frac{imgSize \cdot height}{2}$$

The three-dimensional geo-location of a pixel in a correlated oblique image is then calculated. The following formula can be used, where P is the original point in image coordinates, h is the expected terrain height of the corresponding world coordinate, $(X_0, Y_0, Z_0)$ is the camera location in world coordinates, and r is the 3×3 rotation matrix representing the camera orientation. FocalLength is the camera's focal length, invScaleFactor is the film scaling factor (in terms mm per pixels), imgSize.width is the width of the image in pixels, imgSize.height is the height of the image in pixels, and W is the resulting point in world coordinates (m):

$$PF \cdot x = \left(P \cdot x - \frac{imgSize \cdot width}{2}\right) * invScaleFactor$$

$$PF \cdot y = \left(P \cdot y - \frac{imgSize \cdot height}{2}\right) * invScaleFactor$$

$$W \cdot x = (X_0 - h) \frac{r_{11}PF \cdot x + r_{21}PF \cdot y - r_{31}FocalLength}{r_{13}PF \cdot x + r_{23}PF \cdot y - r_{33}FocalLength} + X_0$$

-continued $$W \cdot y = (Y_0 - h) \frac{r_{12}PF \cdot x + r_{22}PF \cdot y - r_{32}FocalLength}{r_{13}PF \cdot x + r_{23}PF \cdot y - r_{33}FocalLength} + Y_0$$

$$W \cdot z = h$$

In one embodiment, these formulas are executed through a graphics processor unit (GPU) to improve performance. The above three-dimensional recovery formula requires a valid z-value for the terrain, in order to provide an accurate estimation. The best method of doing this would be to cast a ray, beginning at an x, y image location and then finding the exact intersection of this ray with the enhanced terrain model. However, this process is very expensive computationally and significantly slows down the user interaction with the system. The equivalent operation of this ray-casting operation can be performed on the GPU as a "reverse-projection" of the enhanced terrain model onto the image. Using the above two-dimensional recovery, the enhanced terrain model is projected onto an off-screen frame-buffer equivalent to an oblique image size, where every pixel in this buffer contains the z-value of the "reverse-projected" terrain model. To recover the correct z-value that would result by casting a ray beginning at the pixel location and ending at the first hit into the terrain model, a simple look-up of the corresponding pixel of the off-screen frame-buffer can be performed.

The results of the mapping of the pixels are output as a correlation solution data set (block 309). This data set is produced for each image or set of images. This solution set can be used by all components and tools in the system including path finding, distance measurement, visibility, three-dimensional lens, structure identification and similar components and tools. The solution data can be stored in any persistent storage system in communication with the system (block 311).

Figure 4:
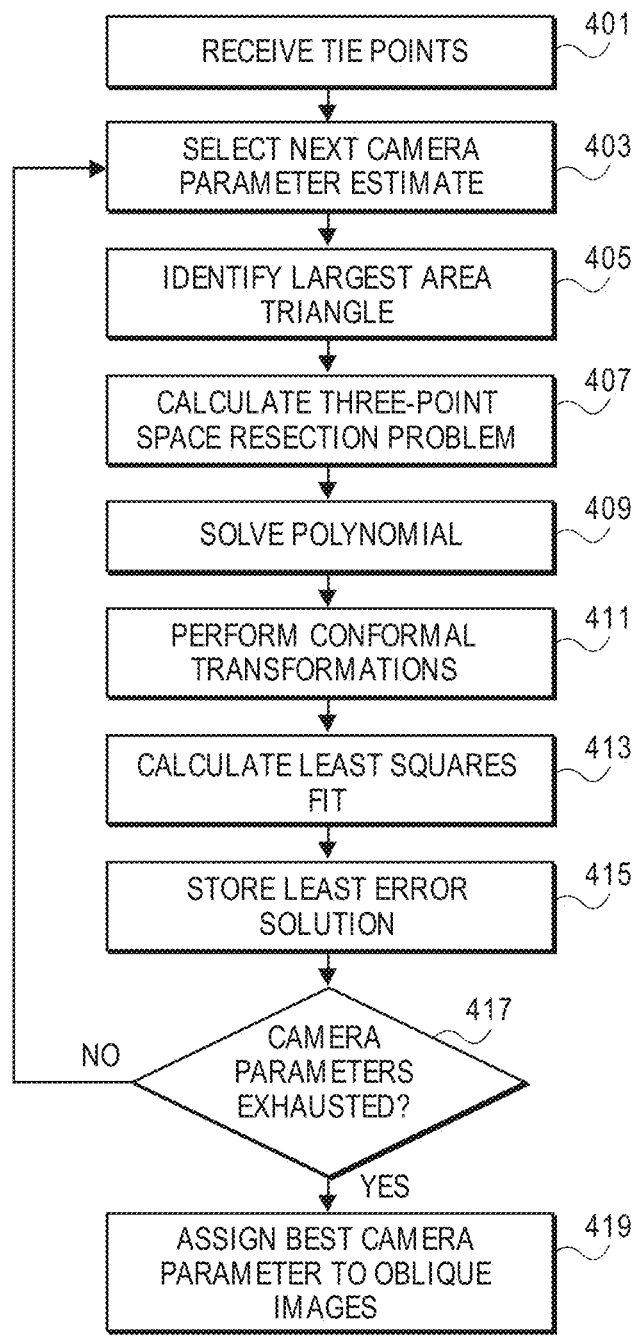
FIG. 4 is a flowchart of one embodiment of a process for determining camera parameters.

FIG. 4 is a flowchart of one embodiment of a process for determining camera parameters. The process of determining camera parameters is dependent on the identification of a set of tie points as described above (block 401). The process then selects a set of initial camera parameters upon which other camera parameters will be estimated (block 403). The selected initial camera parameters can be initial values within a range for each parameter. The process iterates through each combination of selected parameter values. In one embodiment, internal camera parameters, such as focal length and film size, are excluded from the estimation process. These are selected parameters that are iterated through. The entire estimation process can be completed in less than fifteen seconds as measured on an Intel Pentium-3 based machine. If any selectable parameters are known, then the iteration is simplified as the number of permutations of the selectable parameters is reduced.

The camera model can be described by a set of collinearity equations:

$$Kx = F \frac{r_{11}(X-X_0) + r_{12}(Y-Y_0) + r_{13}(Z-Z_0)}{r_{31}(X-X_0) + r_{32}(Y-Y_0) + r_{33}(Z-Z_0)}$$

$$Ky = F \frac{r_{21}(X-X_0) + r_{22}(Y-Y_0) + r_{23}(Z-Z_0)}{r_{31}(X-X_0) + r_{32}(Y-Y_0) + r_{33}(Z-Z_0)}$$

Where X, Y, Z=Coordinates of a point in world/ground space, $K_x$, $K_y$=Coordinates of a projected point on the image plane, F=Focal length, $X_0$, $Y_0$, $Z_0$=Coordinates of the Camera position (Projection Center), and $r_i$=the elements of the 3×3 rotation matrix defining the camera orientation. In the framework as described above, F=focal length is set at the beginning of the iterative process. The projection coordinates $K_x$, $K_y$ are expressed in the ground coordinate system in millimeters. Thus, given a film size D, (which is also set at the beginning of the iterative process), and the pixel coordinates $P_x$, $P_y$ of a projected point on the image plane, then the ImageScale=max(ImagePixelDim$_x$, ImagePixelDim$_y$)/D; $K_x$=($P_x$−CenterOfImage$_x$)*ImageScale; and $K_y$=($P_y$−CenterOfImage$_y$)*ImageScale.

The selected set of parameter values are utilized to identify a largest area triangle within the set of images using the tie points (block 405). The largest triangle is used to calculate a three-point space resection problem using the world-image pairs for the tie points (block 407). The three tie points that form the largest area triangle on the ground are identified. To identify the largest area triangle, all possible 3-point combinations are taken to compute the area of their formed triangle using Heron's formula, which states that the area (A) of a triangle whose sides have lengths a, b, and c is:

$$A = \frac{\sqrt{(a+b+c)\cdot(a+b-c)\cdot(b+c-a)\cdot(c+a-b)}}{4}.$$

The three-point space resection problem is solved where O is the perspective center (or top vertice of a tetrahedron) and $P_1$, $P_2$, $P_3$ are three world space reference points (forming the base of the tetrahedron) whose distances a, b, c (i.e. the distances between $P_1$, $P_2$, $P_3$) are also known. From the image coordinates of the given points we form unit vectors along the edges of the tetrahedron $OP_1$, $OP_2$, $OP_3$ and then use the dot products of these vectors to get the internal angles α, β, γ. This leaves distances from $P_1$, $P_2$, $P_3$ to O referred to as $S_1$, $S_2$ and $S_3$ as the unknowns to be computed. Given points $P_1$, $P_2$, $P_3$ on the ground and the internal angles α, β, γ, (computed by forming $OP_1$, $OP_2$, $OP_3$ on the image plane), we recover the distances $S_1$, $S_2$ and $S_3$ which are then used to recover the center of projection O. To accomplish this, Grunert's solution (as described in Tan, W., 2004, Surveying and Land Information Science, 64(3):177-179) is followed, which uses the law of cosines. This involves the solving of quartic equations in order to obtain a solution. Example solutions to the quartic equations include the Ferrari Polynomial (as described in Tan, Ibid), which returns two roots, and the use of the Newton-Raphson iteration (as described in Tan, Ibid) using a starting point of v=1.0. In this implementation, two starting points are used for the Newton-Raphson iteration (v=0.5, v=1.5), in order to yield two solutions. The Abramowitz and Stegun algorithms can also be used for a solution to the quartic equation, which yields an additional 4 solutions (as described in Abramowitz, M and Stegun, I.A., 1972, Handbook of Mathematical Functions, U.S. Department of Commerce). Using each of these methods results in a total of eight solutions to the three-point resection problem (block 409).

A conformal transformation for each of the guess values from the eight solutions is then calculated (block 411). Given the distances $S_1$, $S_2$ and $S_3$ the locations of the 3 model points in the camera coordinate system can be calculated as follows: $P'_1=S_1\cdot i_1$ $P'_2=S_2\cdot i_2$ $P'_3=S_3\cdot i_3$ with the vectors $i_1$, $i_2$, $i_3$ formed as $i_1$=($PC_1\cdot x$, $PC_1\cdot y$, F), $i_2$=($PC_2\cdot x$, $PC_2\cdot y$, F), $i_3$=($PC_3\cdot x$, $PC_3\cdot y$, F) where F is the given focal length defined at the beginning of iteration process. Given the points $P'_1$, $P'_2$, $P'_3$ and their counterparts $PC_1$, $PC_2$, $PC_3$ all in the camera coordinate system a conformal transformation can be applied as defined by Dewitt (as described in Dewitt, B. A. 1996, Photogrammetric Engineering and Remote Sensing, 62(1):79-83)

The results of the conformal transformation give an initial approximation X, Y, Z for the camera position, and a set of the angles for the initial approximation of the camera orientation. The space resection algorithm can then be used to compute the final solution. The collinearity equations described above are first linearized using Taylor's theorem. The resulting system is then solved using the Gauss-Newton method. One of the challenges of solving the space resection problem using this approach is that a good initial approximation is required, otherwise the algorithm will diverge. The process described above ensures that a good approximation is provided for general camera orientations, as opposed to the assumptions of planar imagery that previous methods have relied upon.

Finally, a least squares fit is calculated for the solution (block 413). The least squares fit can be performed using the Gauss-Newton method. A comparison is made between the calculated least squares fit and a stored least squares fit that represents a previous 'best guess' in selection of the camera parameters. If the calculated least squares fit is an improvement over the stored least squares fit, then the selected camera parameters are stored along with their least squares fit value (block 415). If the calculated least squares fit is not an improvement, then the camera value parameters and their least squares fit are discarded.

A check is made to determine whether all of the camera parameters have been exhausted by iteration through each permutation of the combination of the camera parameter values (block 417). If all of the permutations of the parameters have not been exhausted, then the next set of parameters are selected and the process continues (block 403). If all of the parameter permutations have been exhausted, then the stored set of parameters that represent the best fit for the images are assigned to the corresponding images (block 419).

Figure 5:
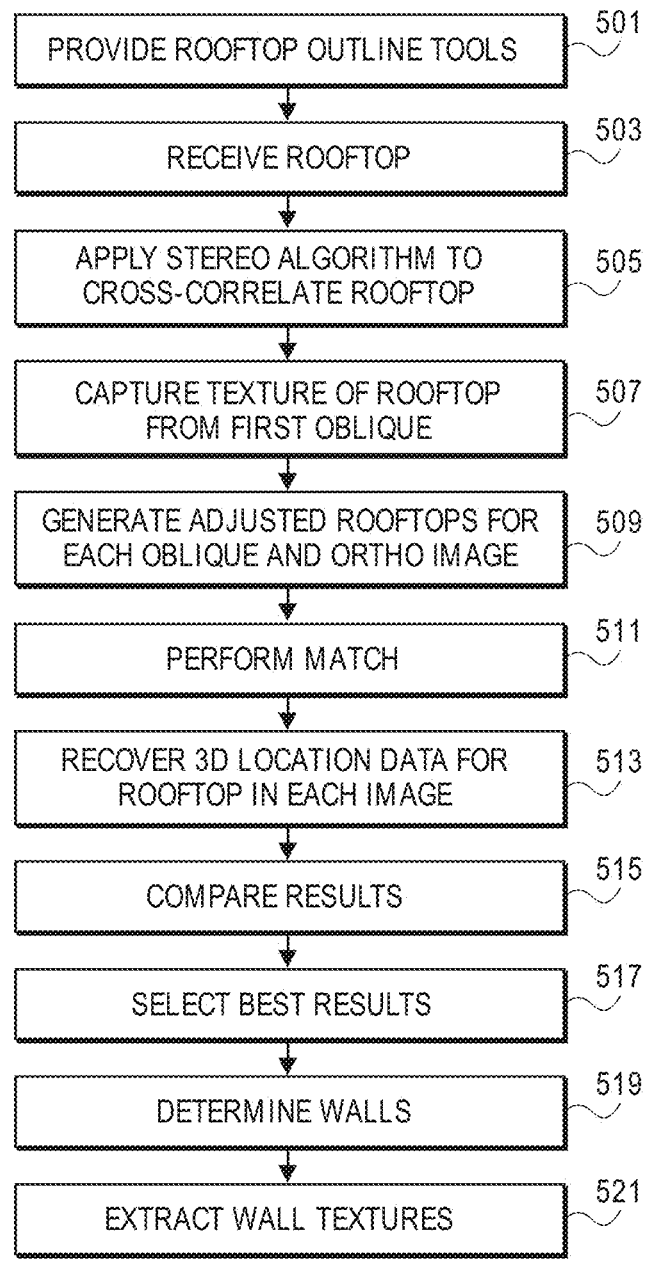
FIG. 5 is a flowchart of one embodiment of a process for structure extraction.

FIG. 5 is a flowchart of one embodiment of a process for structure extraction. The process of structure extraction identifies and generates three-dimensional models of buildings and similar structures within an area within the images selected by a user. The process is initiated by a user identifying a rooftop or similar aspect of a structure (block 503). The user can identify the input aspect of the structure through the user interface of the visualization and analysis tool. The interface can provide a line drawing tool, rectangle drawing tool, circle drawing tool or similar set of tools to enable a user to match a shape to that of an aspect of a structure. (block 501).

The input aspect of the structure is identified in a single image. The image can be either the orthographic or any of the correlated oblique views. The structure extraction process then identifies the aspect in each of the correlated images by applying a stereo algorithm to cross-correlate the rooftop or similar aspect across each correlated image (block 505). This will reveal the 3D positions of the roof points.

In the image with the identified aspect of the structure a texture is extracted within the boundary of the aspect (block 507). For example, when the aspect is the rooftop, the pixels of the rooftop are extracted as a texture. A copy of the extracted texture is then adjusted for the orientation of each of the correlated images to generate a texture that should match one present in each image (block 509).

A pattern matching algorithm is then utilized to locate the generated textures in each of the corresponding images (block 511). The search is centered on the location data generated in the oblique targeting and cross-correlation calculation. In one embodiment, a GPU-based pattern matching method referred to as an "occlusion query" is utilized. The pattern matching method counts the number of pixels that have been successfully drawn from a shape. A fragment program cancels or rejects the pixels of a shape to be drawn using a comparison measure. The occlusion query counts the number of pixels that were cancelled or rejected. Once the adjusted shape for each oblique is generated an iterative process is applied. The adjusted shape is drawn with all the pixels activated. This enables a count of the maximum possible number of pixels that can be drawn in the situation where a full match occurs. The count is used to normalize all subsequent matches for comparisons. For each oblique, the set of all possible x, y locations for the adjusted shape is iterated through. At each iteration, the fragment shader is activated to perform the texture comparison. The number of successfully drawn pixels is counted using the occlusion query. The number of successfully drawn pixels is normalized by dividing by the maximum number of pixels and a comparison with previous results is made. The result with the highest score is chosen as the match.

The texture of the adjusted rooftop is compared to the corresponding oblique image pixel by pixel at the test location. The comparison includes a comparison of the color of each corresponding pixel ($color_1$, $color_2$). In one embodiment, a color-space conversion to the LAB color-space is performed where the luminance channel is suppressed by a factor of 0.5. The distance of the resulting color-space vectors is then compared to a predefined threshold to determine a match as follows:

$$\text{Match} = vectorLength\left(RGBtoLAB(color_1) \cdot \begin{bmatrix} 0.5 \\ 1.0 \\ 1.0 \end{bmatrix} - RGBtoLAB(color_2) \cdot \begin{bmatrix} 0.5 \\ 1.0 \\ 1.0 \end{bmatrix}\right) < \text{Threshold}$$

The fragment shader discards the pixel if it returns false to the comparison. This causes only the similar pixels to survive and be counted during the process of an occlusion query process. The system automatically matches the selection within the other obliques using the texture from the user-marked oblique, adjusted to the image space (i.e., orientation) of the respective oblique. The system evaluates several positions for the adjusted texture by superimposing the reference texture onto the other oblique images and comparing their luminance and colors pixel-by-pixel. These comparisons are performed within fractions of a second, by taking advantage of a combination of GPU based occlusion queries and specialized fragment programs. In cases where the above automated selection fails, the user may indicate the correct position of the rooftop by clicking his selection in an additional oblique.

Upon matching the pattern, the three-dimensional location data of the pattern is recovered from each image (block 513). The results of each recovery are compared (block 515) and a selection of the best results is made (block 517). This helps to correct for distortion or inaccurate structure identification in the first image. The other aspects of the structure are then determined (block 519). For example, if the rooftop of a building has been determined then the walls are determined by dropping edges from each corner of the building to the base elevation of the terrain (block 519). The structure walls are extracted as one wall per rooftop line segment. These walls consist of the roof-points with their counterparts on the ground. The user can then refine this selection by dragging the points of the outline. This immediately affects the extracted building.

This results in a three-dimensional model of the structure or feature. The textures associated with each side, wall or other aspect of the modeled structure or features are then extracted from the image with the best point of view for that aspect (block 521). The extracted textures and model can be stored separately or added to the correlation solution data or similar data structure. These models and textures can be utilized by other models to generate three-dimensional representations of the structures and features of an area.

Figure 6:
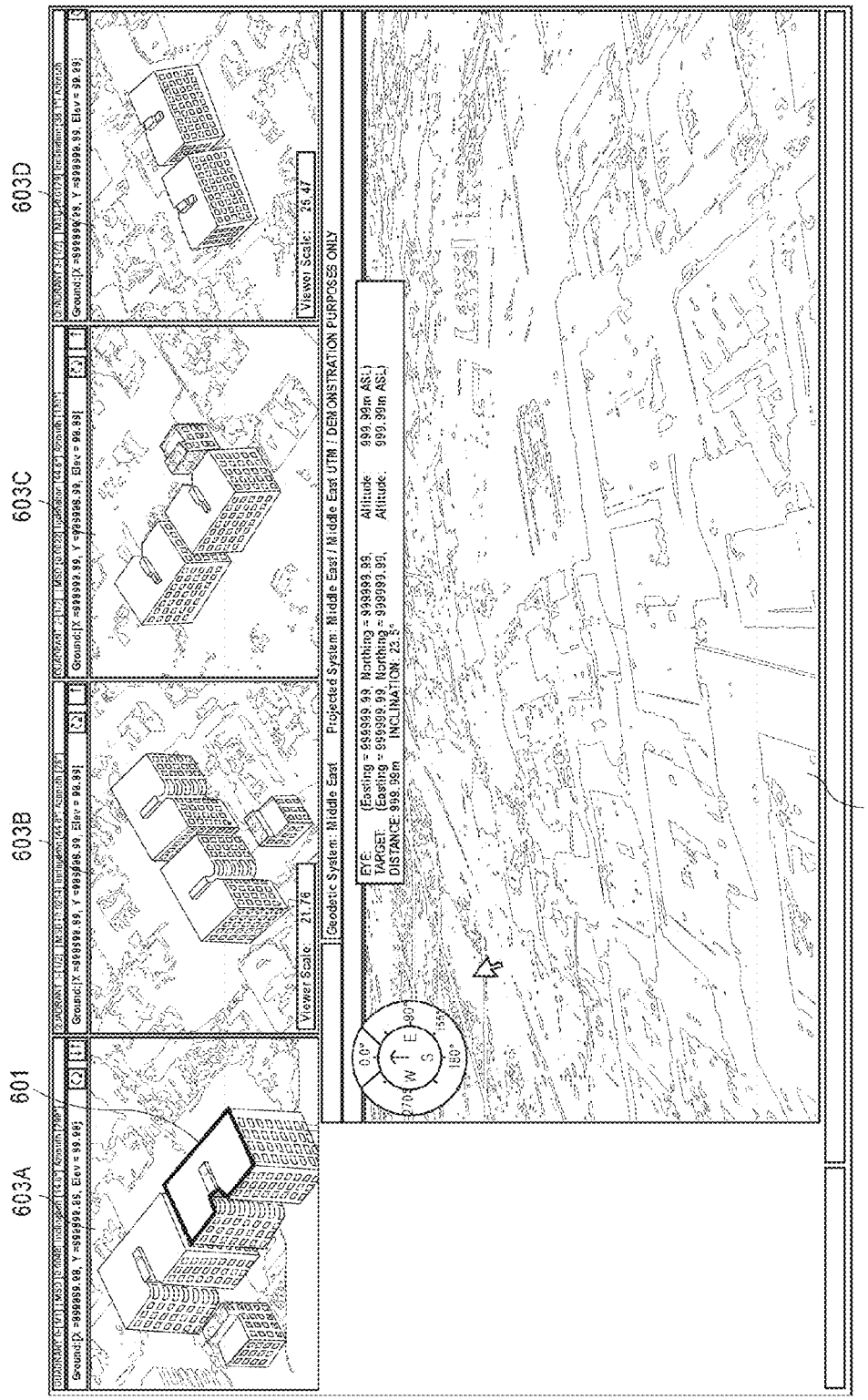
FIG. 6 is a diagram of one embodiment of an interface for inputting the coordinates of a tie point on a structure.

FIG. 6 is a diagram of one embodiment of an interface for inputting the coordinates of a tie point on a structure. The input of tie points is illustrated in the context of a user identifying an aspect of a structure for use in determining a three dimensional model of the structure. The user has selected 601 the rooftop of a building in a first oblique 603A. In the illustrated example, the images 603A-E have been correlated and are being displayed such that the same point is being viewed from the respective angles of each image. The terrain model with the vertical image draped over it is displayed in window 603E. However, the identification of tie points prior to correlation is the same. A user selects a set of points in one of the images. In this example, the selection in image 603A has been completed. As an alternative to the automated correlation process, the user can select one additional point correspondence in any of the images 603B-E.

Figure 7:
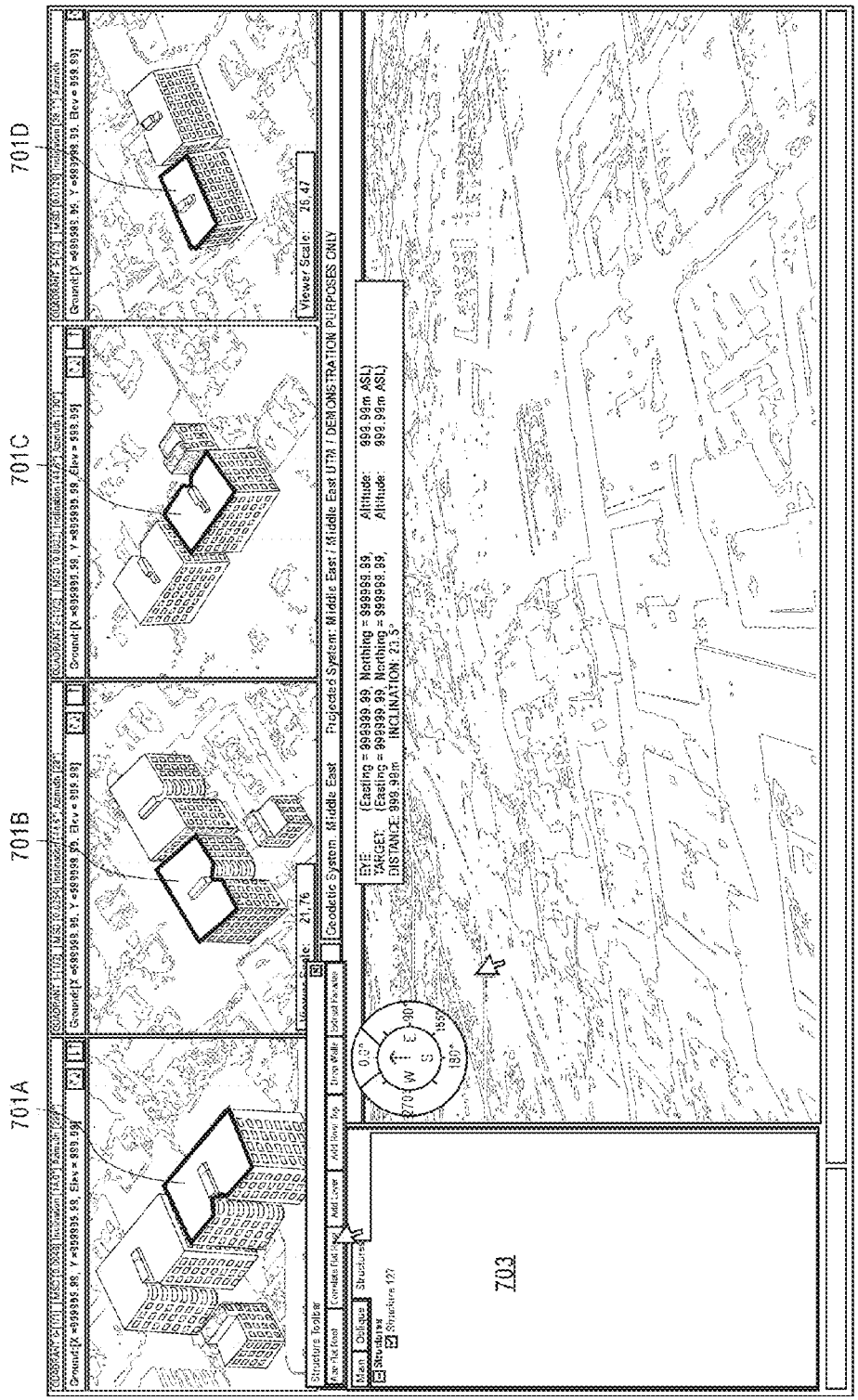
FIG. 7 is a diagram of one embodiment of an interface for displaying automatic structure detection.

FIG. 7 is a diagram of one embodiment of an interface for displaying automatic structure detection. This figure shows the next step of the structure extraction process such that the aspect of the structure identified in the first image has now been matched in each of the other images 701A-C. Any number of images can be simultaneously displayed and the identified structure can be shown in each correlated image. The identified structure can be shown in vertical, oblique or any correlated images.

Once a structure is identified it may be saved and added to an aggregation of stored structures. Any number of structures can be identified in the set of correlated images. Any number of structures can be shown at any given time through the user interface. In one embodiment, the user interface includes a user interface selection mechanism 703 to assist the user in organizing and viewing identified structures, images, projects and the like.

Figure 8:
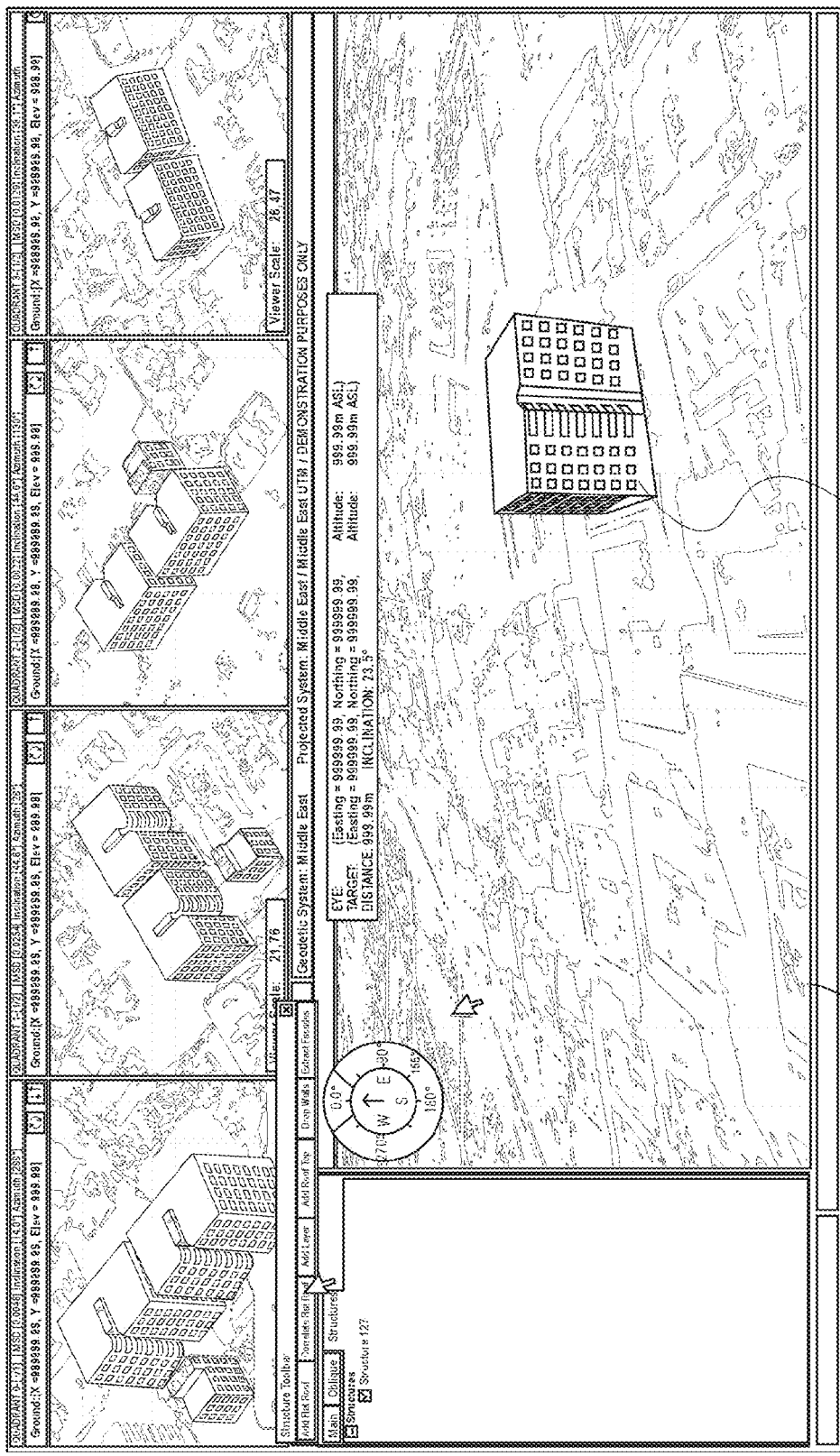
FIG. 8 is a diagram of one embodiment of an interface for three dimensional structure display.

FIG. 8 is a diagram of one embodiment of an interface for three dimensional structure display. The completed extraction is displayed in the model window 803. The three-dimensional structure 801 has been drawn on the terrain map that is draped with the vertical image. The three-dimensional model 801 of the structure has been draped with the extracted textures from the other images to create a complete three-dimensional reproduction of the selected building. This model can be manipulated and viewed from any angle by manipulation of the available images presented through the visualization and analysis tool.

Figure 9:
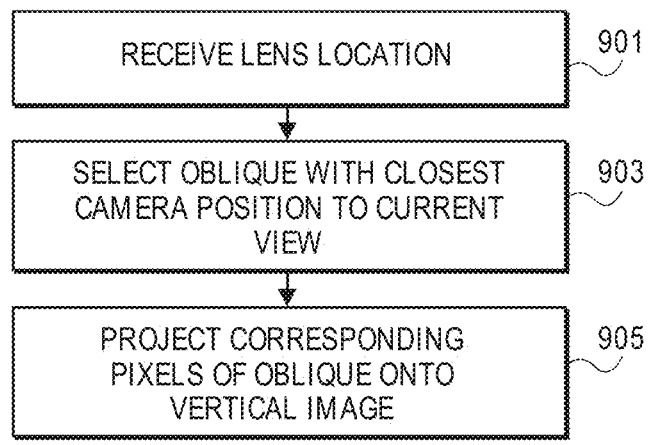
FIG. 9 is a flowchart of one embodiment of a process for lens projection.

FIG. 9 is a flowchart of one embodiment of a process for lens projection. The three-dimensional lens projection tool can be activated by any type of selection mechanism through the user interface of the visualization and analysis tool. The user selects a position to display the lens (block 901). The three-dimensional lens tool then determines the oblique image that has the closest camera position to the current view point of the user (block 903). The portion of the image that maps onto the lens is then projected onto the three-dimensional terrain model that is draped with the vertical image (block 905). The projection can be a pixel by pixel projection onto the lens area. The projection is continuously updated. The lens area can be moved by user interaction with the user interface of the visualization and analysis tool, such as mouse or keyboard directional input. As the lens is moved, the projection of the pixels and the selection of the best oblique is updated.

Figure 10:
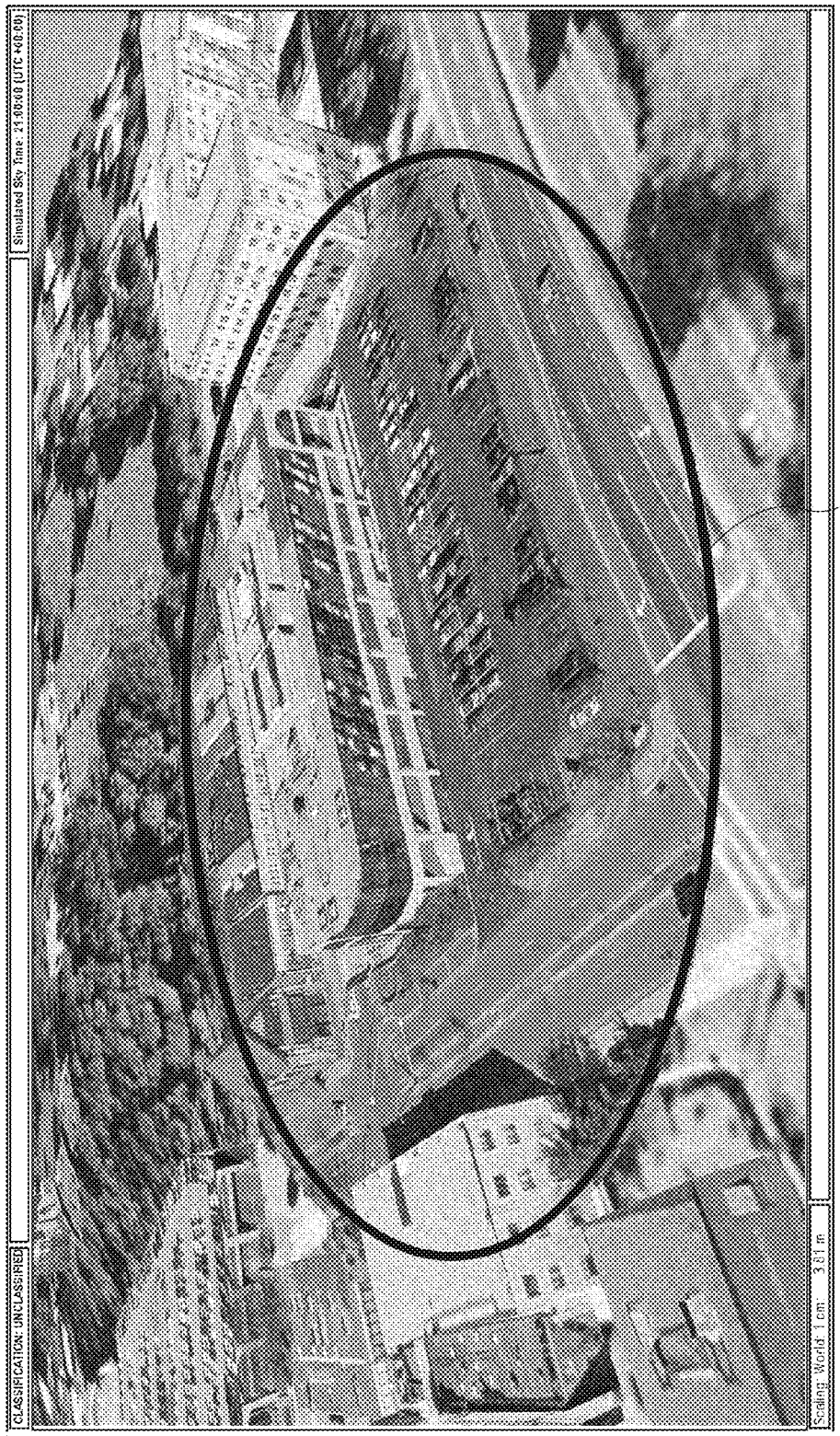
FIG. 10 is a diagram of one embodiment of an interface for displaying a three-dimensional lens.

FIG. 10 is a diagram of one embodiment of an interface for displaying a three-dimensional lens. The lens area 1001 is movable by the user. Similarly, the underlying vertical image 1003 can be repositioned. The interior of the lens area 1001 includes the mapped pixels of the oblique image that most closely aligns to the current user viewpoint of the vertical image. Any size or shape of lens area 1001 can be utilized. The lens area can have a drawn boundary or the full lens area can be used to project the correlated image. In one embodiment, multiple lenses can be positioned on an image FIG. 11 is a diagram of one embodiment of an integrated visualization and analysis interface. This image illustrates a set of windows for accessing the tools of the visualization and analysis tool. The visualization and analysis tool can support any number of images and related data sources being displayed. The displayed images can include correlated oblique images 1103A-D, a three-dimensional terrain model with a vertical image draped over it 1105, and similar content. A reference marker 1101 that indicates the common reference or view point for each of the currently displayed images. Other data sources, such as video sources 1107 that are related to a reference point or area that is currently displayed. Information displays 1109A-D that provide information about each of the images including orientation, scale, coordinates and similar information. Any number of other additional tools or components can also be displayed or accessed through the visualization and analysis tool including those discussed previous and those to be discussed subsequently.

Figure 12:
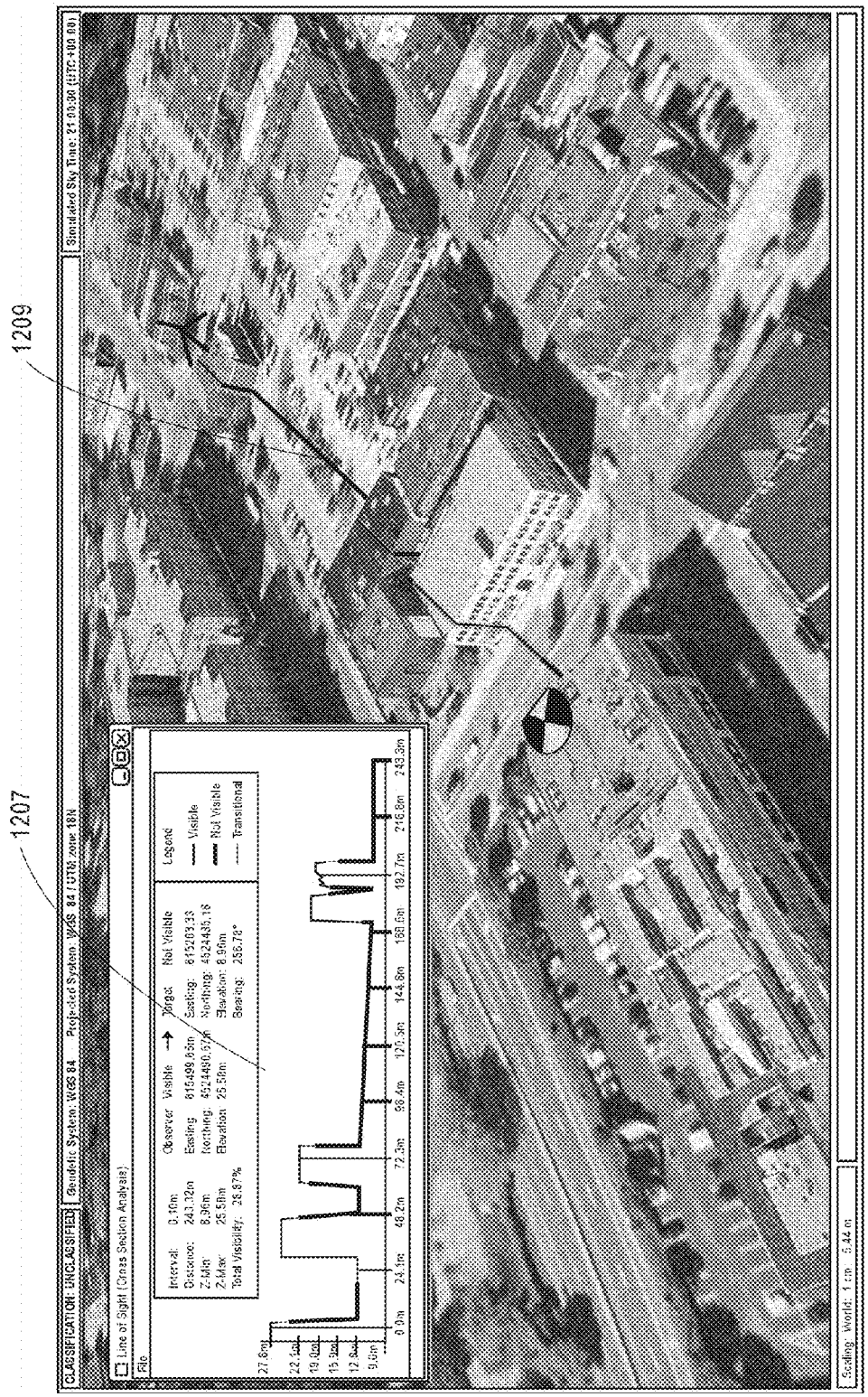
FIG. 12 is a diagram of one embodiment of an interface for displaying line of sight analysis.

FIG. 12 is a diagram of one embodiment of an interface for displaying line of sight analysis. The line of sight tool is displayed through the visualization and analysis tool. The line of sight tool includes the identification 1201 of the line of sight on the vertical image. A selected target point 1205 that a user desires to view and a selected viewpoint 1203 are part of the line of sight 1201. A user can select any point within any image shown in the visualization and analysis tool as either a viewpoint or target point.

A horizontal line of sight map 1207 shows the elevation along the line of sight. This enables the user to determine at what point a viewpoint of the target is obstructed and other information about the line of sight. The horizontal line map can include distance information, a determination of visibility of the target from the viewpoint, degree of visibility and similar information.

Figure 13:
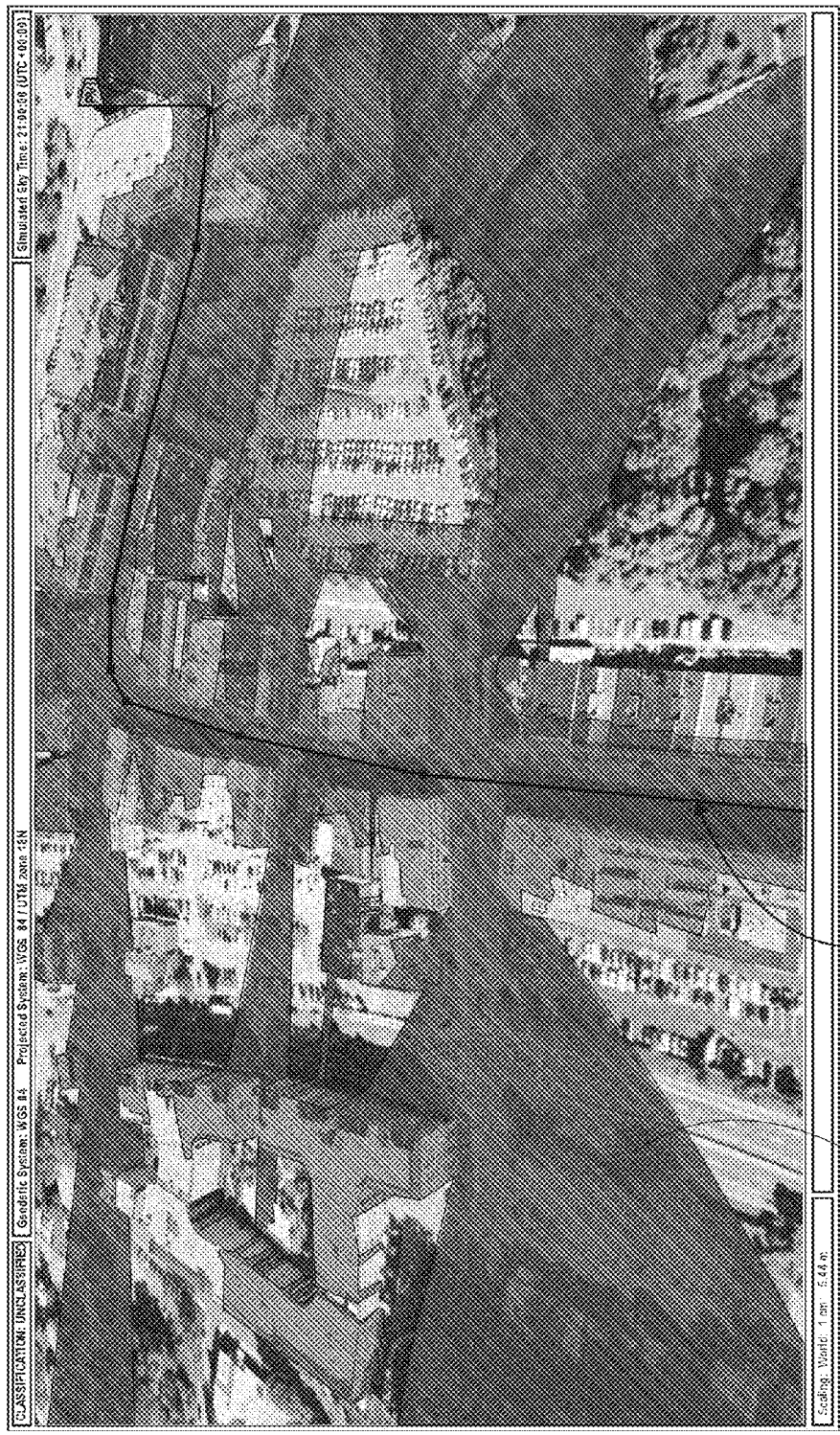
FIG. 13 is a diagram of one embodiment of an interface for path finding visibility analysis.

FIG. 13 is a diagram of one embodiment of an interface for path finding and visibility analysis. The visibility and path finding tools can be combined to illustrate the visibility of an entire path. This can be useful for determining a safest route for a convoy or similar use. A user defines a path 1305 on the terrain map. The visibility component then determines all areas 1303 that can view any portion of the path or the nearest portion of the path. Areas of visibility 1303 can be colored or similarly identified. In other embodiments, the areas of visibility may be outlined, bordered or similarly indicated. Any number of paths and areas of visibility can be determined and represented on any type of image that has been correlated. Paths that are identified can have any length or complexity.

Figure 14:
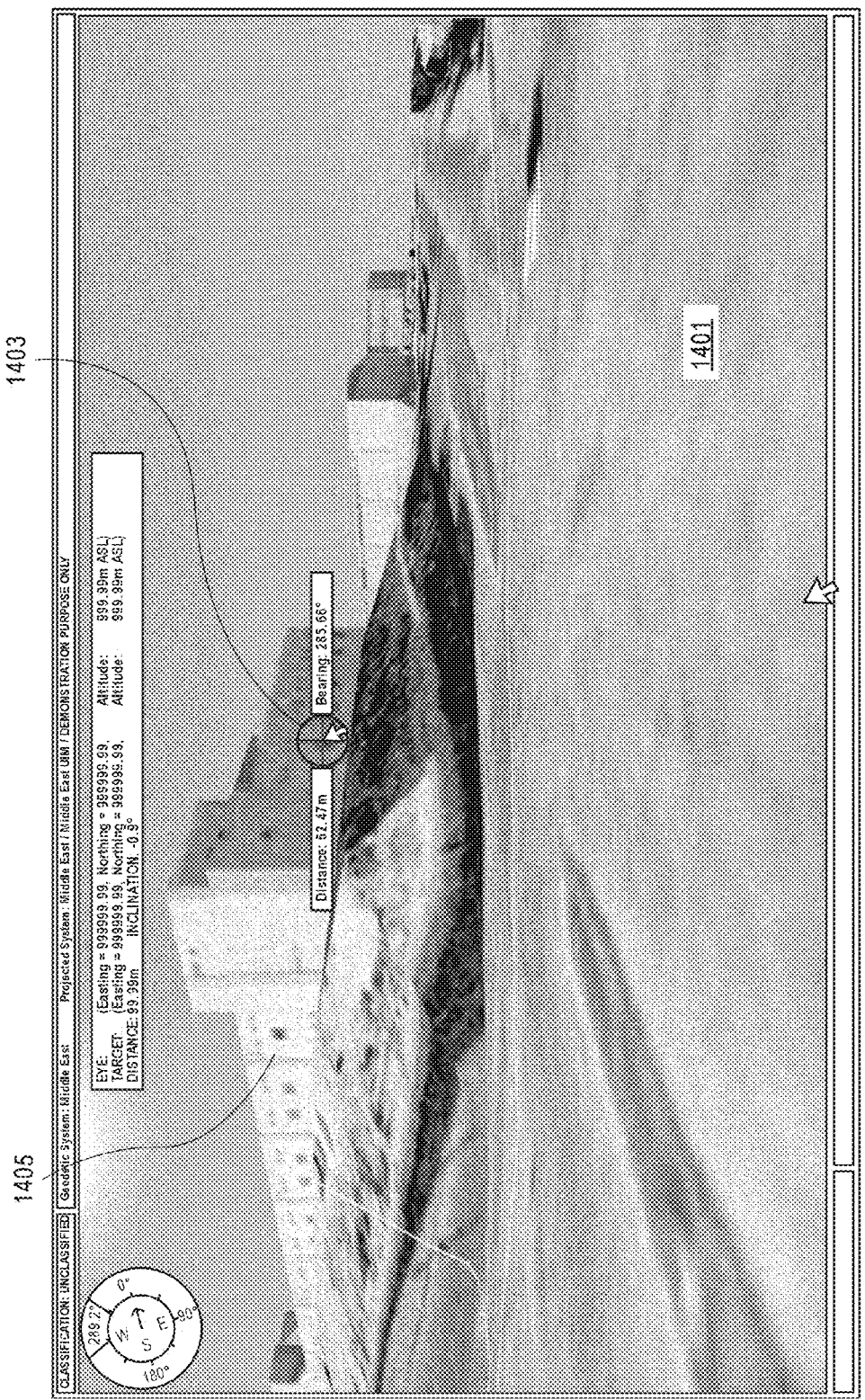
FIG. 14 is a diagram of one embodiment of an interface for first-person navigation.

FIG. 14 is a diagram of one embodiment of an interface for first-person navigation. The visualization and analysis tool can also include a first person viewing mode in the user interface. The first person mode 1401 zooms into the terrain map and gives the user a perspective of an individual on the ground. The map can then be navigated through a peripheral device by moving the camera around as though walking or driving across the map. A targeting interface 1403 allows the user to select a location on the screen to determine distance, bearing and similar information. Extracted structures 1405 are also displayed as part of the three-dimensional navigable landscape. Any number of extracted structures 1405 can be displayed. Other data can also be displayed including line of sight, pathfinding and similar data.

The first-person navigation interface 1401 can be utilized for training simulations, walk-throughs, and similar activities. The correlated image, model and structure data enable accurate recreation of real world settings in three-dimensional space using two-dimensional imagery. Additional graphical and three-dimensional models could be added by a user to enhance the realism of the training simulation or walk-throughs such as vehicle models, vegetation simulation and similar elements.

In one embodiment, the geocoding engine, visualization tool and overall imaging system may be implemented in software, for example, in a simulator, emulator or similar software. A software implementation may include a microcode implementation. A software implementation may be stored on a machine readable medium. A "machine readable" medium may include any medium that can store or transfer information. Examples of a machine readable medium include a ROM, a floppy diskette, a CD-ROM, an optical disk, a hard disk, removable data storage such as memory sticks, universal serial bus memory keys or flash drives, compact flash, jump drives, DiskOnKey, portable image storage thumb drives and similar media and mediums. In one embodiment, the software implementation may be in an object oriented paradigm or similar programming paradigm. The parts of the system may be structured and coded as a set of interrelated objects.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method of generating three-dimensional (3D) models of structures within an image area, the method comprising:
    selecting at least one structure from a geocoded image within the image area;
    receiving one or more oblique images corresponding to the selected at least one structure;
    selecting a drawing element;
    overlaying the drawing element on at least one of the one or more oblique images;
    matching multiple boundary points of the overlaid drawing element to corresponding boundary points of the selected at least one structure of the received one or more oblique images; and
    extracting a 3D structure comprising a bounded space of the matched multiple boundary points for one or more aspects of the selected at least one structure.

2. The method of claim 1, further comprising performing the overlaying and matching steps for a plurality of the one or more oblique images.

3. The method of claim 1, further comprising performing the matching step for a plurality of the one or more aspects.

4. The method of claim 1, further comprising extracting one or more textures within the bounded space of each of the one or more aspects.

5. The method of claim 4, further comprising adjusting the one or more extracted textures for an orientation of each of the matched oblique images to generate an adjusted texture.

6. The method of claim 1, further comprising adjusting a matched boundary point automatically to a nearest corner.

7. The method of claim 1, wherein the at least one structure comprises a building.

8. A non-transitory computer machine readable medium having a set of instructions stored therein which when executed cause a machine to perform a set of operations comprising:
  selecting at least one structure from a geocoded image within an image area;
  receiving one or more oblique images corresponding to the selected at least one structure;
  selecting a drawing element;
  overlaying the drawing element on one or more oblique images;
  matching multiple boundary points of the overlaid drawing element to corresponding boundary points of the selected at least one structure of the received one or more oblique images; and
  extracting a 3D structure comprising a bounded space of the matched multiple boundary points for one or more aspects of the selected at least one structure.

9. The machine readable medium of claim 8, having further instructions stored therein, which when executed cause the machine to perform the set of operations further comprising:
  performing the overlaying and matching steps for a plurality of the one or more oblique images.

10. The machine readable medium of claim 8, having further instructions stored therein, which when executed cause the machine to perform the set of operations further comprising:
  performing the matching step for a plurality of the one or more aspects.

11. The machine readable medium of claim 8, having further instructions stored therein, which when executed cause the machine to perform the set of operations further comprising:
  extracting textures within the bounded space of each of the one or more aspects.

12. The machine readable medium of claim 8, having further instructions stored therein, which when executed cause the machine to perform the set of operations further comprising:
  adjusting the extracted texture for an orientation of each of the matched oblique images to generate an adjusted texture.

13. The machine readable medium of claim 8, having further instructions stored therein, which when executed cause the machine to perform the set of operations further comprising:
  adjusting a matched boundary point automatically to a nearest corner.

14. The machine readable medium of claim 8, having further instructions stored therein, which when executed cause the machine to perform the set of operations wherein the at least one structure comprises a building.

15. A non-transitory storage system including software modules, comprising:
  a visualization tool implemented on the non-transitory storage system for:
    displaying a first image;
    selecting at least one structure from a geocoded image within an image area;
    displaying one or more oblique images corresponding to the selected at least one structure;
    selecting a drawing element from a plurality of drawing elements;
    overlaying the selected drawing element on one or more displayed oblique images;
    matching multiple boundary points of the overlaid drawing element to corresponding boundary points of the selected at least one structure of the received one or more oblique images; and
    extracting a 3D structure comprising a bounded space of the matched multiple boundary points for one or more aspects of the selected at least one structure.

16. The non-transitory storage system of claim 15, wherein the overlaying and matching steps are repeatable for a plurality of the one or more oblique images.

17. The non-transitory storage system of claim 15, wherein the matching step is repeatable for a plurality of the one or more aspects.

18. The non-transitory storage system of claim 15, further comprising extracting textures within the bounded space of each of the one or more aspects.

19. The non-transitory storage system of claim 18, further comprising an automatic adjuster for adjusting the extracted texture for an orientation of each of the matched one or more oblique images.

20. The non-transitory storage system of claim 15, further comprising an automatic adjuster for adjusting a matched boundary point automatically to a nearest corner.

* * * * *